US007085743B2

(12) United States Patent
Schull

(10) Patent No.: US 7,085,743 B2
(45) Date of Patent: Aug. 1, 2006

(54) SYSTEM AND METHOD FOR CREATING AND RUNNING PROTECTED INFORMATION

(75) Inventor: Jonathan Schull, Haverford, PA (US)

(73) Assignee: SL Patent Holdings LLC, New York, NY (US)

( * ) Notice: Subject to any disclaimer, the term of this patent is extended or adjusted under 35 U.S.C. 154(b) by 0 days.

(21) Appl. No.: 10/955,069

(22) Filed: Sep. 30, 2004

(65) Prior Publication Data

US 2005/0039026 A1    Feb. 17, 2005

Related U.S. Application Data

(63) Continuation of application No. 10/851,606, filed on May 21, 2004, which is a continuation-in-part of application No. 09/764,293, filed on Jan. 19, 2001, which is a continuation of application No. 08/631,411, filed on Apr. 12, 1996, now Pat. No. 6,266,654, which is a continuation-in-part of application No. 07/990,455, filed on Dec. 15, 1992, now Pat. No. 5,509,070.

(51) Int. Cl.
G06Q 99/00 (2006.01)

(52) U.S. Cl. .......................................... 705/59; 705/56

(58) Field of Classification Search .................. 705/54, 705/53, 56, 59; 713/164, 184, 186, 206
See application file for complete search history.

(56) References Cited

U.S. PATENT DOCUMENTS

| | | | |
|---|---|---|---|
| 3,609,697 | A | 9/1971 | Blevins et al. |
| 3,798,605 | A | 3/1974 | Feistel |
| 3,806,882 | A | 4/1974 | Clarke |
| 3,956,615 | A | 5/1976 | Anderson et al. |
| 4,168,396 | A | 9/1979 | Best |
| 4,253,157 | A | 2/1981 | Kirschner et al. |
| 4,278,837 | A | 7/1981 | Best |

(Continued)

FOREIGN PATENT DOCUMENTS

EP    0 084 441 A2    1/1982

(Continued)

OTHER PUBLICATIONS

Anguita, Davide, "Smart Adaptive Systems: State of the Art and Future Directions of Research", DIBE, University of Geneva, from the Internet at www.eunite.org, 2001.

(Continued)

*Primary Examiner*—Salvatore Cangialosi
(74) *Attorney, Agent, or Firm*—Brown Raysman Millstein Felder & Steiner LLP

(57) ABSTRACT

A method and apparatus of encouraging distribution, registration, and purchase of free copyable software and other digital information which is accessed on a User's System via a Programmer's Program. Software tools which can be incorporated into a Programmer's Program allow the User to access Advanced Features of the Programmer's Program only in the presence of a valid Password which is unique to a particular Target ID generated on an ID-Target such as the User's System. Advanced features will thus re-lock if the Password is copied to another ID-target. If a valid Password is not present, the User is invited to obtain one, and provided with the means of doing so, and of installing that Password in a place accessible to the User's System on subsequent occasions. The present invention also provides Programmers with means to invoke business operations as well as computational operations with their programs, and thus to automatically obtain payment from Users who elect to obtain passwords.

28 Claims, 2 Drawing Sheets

U.S. PATENT DOCUMENTS

| | | |
|---|---|---|
| 4,319,079 A | 3/1982 | Best |
| 4,433,207 A | 2/1984 | Best |
| 4,458,315 A | 7/1984 | Uchenick |
| 4,528,643 A | 7/1985 | Freeny, Jr. |
| 4,593,376 A | 6/1986 | Volk |
| 4,658,093 A | 4/1987 | Hellman |
| 4,683,553 A | 7/1987 | Mollier |
| 4,685,055 A | 8/1987 | Thomas |
| 4,688,169 A | 8/1987 | Joshi |
| 4,740,890 A | 4/1988 | William |
| 4,747,139 A | 5/1988 | Taaffe |
| 4,757,534 A | 7/1988 | Matyas et al. |
| 4,796,220 A | 1/1989 | Wolfe |
| 4,817,140 A | 3/1989 | Chandra et al. |
| 4,827,508 A | 5/1989 | Shear |
| 4,864,494 A | 9/1989 | Kobus, Jr. |
| 4,864,616 A | 9/1989 | Pond et al. |
| 4,885,778 A | 12/1989 | Weiss |
| 4,888,798 A | 12/1989 | Earnest |
| 4,896,346 A | 1/1990 | Belfield et al. |
| 4,924,378 A | 5/1990 | Hershey et al. |
| 4,949,248 A | 8/1990 | Caro |
| 4,949,379 A | 8/1990 | Cordell |
| 4,991,208 A | 2/1991 | Walker et al. |
| 4,998,279 A | 3/1991 | Weiss |
| 4,999,806 A | 3/1991 | Chernow et al. |
| 5,010,571 A | 4/1991 | Katznelson |
| 5,023,907 A | 6/1991 | Johnson et al. |
| 5,027,398 A | 6/1991 | Miyoshi |
| 5,046,090 A | 9/1991 | Walker et al. |
| 5,046,092 A | 9/1991 | Walker et al. |
| 5,047,928 A | 9/1991 | Wiedemer |
| 5,054,064 A | 10/1991 | Walker et al. |
| 5,058,162 A | 10/1991 | Santon et al. |
| 5,065,429 A | 11/1991 | Lang |
| 5,070,479 A | 12/1991 | Nakagawa |
| 5,099,516 A | 3/1992 | Durkin et al. |
| 5,103,476 A | 4/1992 | Waite et al. |
| 5,109,413 A | 4/1992 | Comerford et al. |
| 5,113,518 A | 5/1992 | Durst, Jr. et al. |
| 5,117,458 A | 5/1992 | Takaragi et al. |
| 5,119,319 A | 6/1992 | Tanenbaum |
| 5,126,728 A | 6/1992 | Hall |
| 5,138,712 A * | 8/1992 | Corbin .................. 705/59 |
| 5,166,886 A | 11/1992 | Molnar et al. |
| 5,199,066 A | 3/1993 | Logan |
| 5,222,134 A | 6/1993 | Waite et al. |
| 5,235,642 A | 8/1993 | Wobber et al. |
| 5,257,373 A | 10/1993 | Kurihara et al. |
| 5,260,999 A * | 11/1993 | Wyman .................. 705/59 |
| 5,291,598 A | 3/1994 | Grundy |
| 5,293,452 A | 3/1994 | Picone et al. |
| 5,305,447 A | 4/1994 | Hampshire |
| 5,337,360 A | 8/1994 | Fischer |
| 5,363,483 A | 11/1994 | Jones et al. |
| 5,438,508 A | 8/1995 | Wyman |
| 5,479,509 A | 12/1995 | Ugon |
| 5,490,216 A | 2/1996 | Richardson, III |
| 5,495,411 A | 2/1996 | Ananda |
| 5,509,070 A * | 4/1996 | Schull .................. 705/54 |
| 5,530,752 A | 6/1996 | Rubin |
| 5,606,609 A | 2/1997 | Houser et al. |
| 5,629,980 A | 5/1997 | Stefik et al. |
| 5,634,012 A | 5/1997 | Stefik et al. |
| 5,638,443 A | 6/1997 | Stefik et al. |
| 5,646,992 A * | 7/1997 | Subler et al. .................. 705/53 |
| 5,649,013 A | 7/1997 | Stuckey et al. |
| 5,717,604 A | 2/1998 | Wiggins |
| 5,754,864 A | 5/1998 | Hill |
| 5,765,152 A | 6/1998 | Erickson |
| 5,790,664 A | 8/1998 | Coley et al. |
| 5,845,281 A | 12/1998 | Benson et al. |
| 5,933,497 A | 8/1999 | Beetcher et al. |
| 6,189,146 B1 * | 2/2001 | Misra et al. .................. 705/59 |
| 6,243,692 B1 | 6/2001 | Floyd et al. |
| 6,256,393 B1 | 7/2001 | Safadi et al. |
| 6,266,654 B1 | 7/2001 | Schull |
| 6,298,317 B1 | 10/2001 | Wiemann |
| 6,343,280 B1 | 1/2002 | Clark |
| 6,343,295 B1 | 1/2002 | MacLeod et al. |
| 6,434,558 B1 | 8/2002 | MacLeod et al. |
| 6,829,368 B1 | 12/2004 | Meyer et al. |
| 2002/0007456 A1 * | 1/2002 | Peinado et al. ............. 713/164 |
| 2002/0073336 A1 * | 6/2002 | Toy et al. .................. 713/201 |

FOREIGN PATENT DOCUMENTS

| | | |
|---|---|---|
| EP | 0 128 672 A1 | 5/1983 |
| EP | 0 197 963 B1 | 10/1984 |
| EP | 0 180 460 A1 | 5/1985 |
| EP | 0 469 864 A2 | 7/1990 |
| EP | 0 593 305 A2 | 10/1992 |
| GB | 2136175 A | 3/1983 |
| WO | WO 85/02310 | 5/1985 |
| WO | WO 90/02382 | 3/1990 |
| WO | WO 93/01550 | 1/1993 |
| WO | WO 98/16882 | 4/1998 |

OTHER PUBLICATIONS

Best, Robert M., "Preventing Software Piracy with Crypto-Microprocessors", Digest of Papers, VLSI: New Architectural Horizons, Feb. 25-28, 1980, pp. 466-469.

Blom, Rolf, et al., "Encryption Methods in Data Networks", Erickson Technics, No. 3, 1976, pp. 74-105.

Brändli, Martin, "A Process-Oriented Approach for Representing Lineage Information of Spatial Data", 3$^{rd}$ AGILE Conference on Geographic Information Science, Helsinki/Espoo, Finland, May 25-27, 2000, pp. 126-130.

Diffie, Whitfield and Hellman, Martin E., "New Directions in Cryptography", IEEE Transaction on Information Theory, vol. RR22, No. 6, Nov. 1976, pp. 644-653.

Diffie, Whitfield and Hellman, Martin E., "Privacy and Authentification: An Introduction to Cryptography", Proceedings of the IEEE, vol. 67, No. 3, Mar. 1979, pp. 397-427.

Electronic Publishing Resources, Inc. "Protecting Electronically Published Properties Increasing Publishing Profits", Chevy Chase, Maryland, pp. 1-8.

Goulde, Michael A., "Unix and NT Challenge", Computerworld, July. 28, 1997, pp. 1-3.

Guillou, Louis C., "Smart Cards and Conditional Access", Advances in Cryptology—Proceedings of EUROCRYPT 84, Editions Springer-Verlag, 1985, pp. 480-489.

Harrison, David R., "Client/Server Operating Systems: Challenges on All Fronts", Network Computing, No. 508, 1994, pp. 1-3.

Herzberg, Amir and Pinter, Shlomit S., "Public Protection of Software", ACM Transactions on Computer Systems, vol. 5, No. 4, Nov. 1987, pp. 371-393.

Kent, Stephen Thomas, "Protecting Externally Supplied Software in Small Computers", Laboratory for Computer Science, Massachusetts Institute of Technology, Sep. 1980, pp. 1-253.

Mori, R. et al., "Superdistribution: The Concept and the Architecture", *The Transactions of the IEICE*, vol. E 73, No. 7, 1990, Tokyo, JP, pp. 1133-1146*Translation Only*.

Variar, Ganesh, "The Origin of Data", IntelligentEnterprise, from the Internet at www.intelligententerprise.com/020201/503feat3_1.shtml, Feb. 1, 2002, pp. 1-6.

Weingart, Steve H., "Physical Security for the μABYSS System", IBM Thomas J. Watson Research Center, Yorktown Heights, New York, 1987.

White, Steve R. and Comerford, Liam, "ABYSS: A Trusted Architecture for Software Protection", IBM Thomas J. Watson Research Center, Yorktown Heights, New York, 1987, pp. 38-51.

* cited by examiner

SYSTEM AND METHOD FOR CREATING AND RUNNING PROTECTED INFORMATION

This application is a Continuation of U.S. patent application Ser. No. 10/851,606 filed May 21,2004, which is a Continuation-In-Part of presently pending U.S. patent application Ser. No. 09/764,293 filed Jan. 19, 2001 ("the '293 application"). The '293 application is a Continuation of U.S. patent application Ser. No. 08/631,411 filed Apr. 12, 1996 ("the '411 application") now U.S. Pat. No. 6,266,654, which is a Continuation-In-Part of U.S. patent application Ser. No. 07/990,455 filed Dec. 15, 1992 ("the '455 application"), now U.S. Pat. No. 5,509,070.

BACKGROUND FIELD OF THE INVENTION

This invention relates to a method of encouraging distribution, registration, and purchase of freely copyable software and other digital information. The invention applies to software as well as other information which can be repeatedly copied with little loss of fidelity, and which is expressed via a hardware- or software-programmable apparatus, such as a computer or a digital audio tape player.

The Copyability of Software—Problem and Opportunity.

Digitally encoded information ("software") is one of the most economically important commodities of the era. The ease and economy with which perfect copies can be made, copied and distributed has promoted the spread of software and related technologies through "traditional" commercial channels (retail and mail order sales, etc.) and through "non-traditional" distribution channels: computer user groups, user-to-user copying and sharing (e.g., of software and of music and video tapes), digital data networks such as the internet, Compuserve, static media such as CD-ROM disks loaded with large quantities of data, public libraries, and broadcast media. These non-traditional distribution channels in particular have made it difficult for software creators and copyright holders to regulate the use of their creations, or to receive payment and registration information from their users. Consequently, software producers forfeit substantial revenues and valuable information about their customer base and potential markets, while businesses and universities find themselves subject to legal prosecution and intimidation for software piracy.

Two approaches to these problems are copy-deterrence, and copy-encouragement. Copy-deterrence is implemented through laws, license agreements and copy-protection technologies. Copy-encouragement is practiced by "shareware" and small scale marketers who tolerate the low registration rates in order to reach the many potential users who can be reached at little cost through non-traditional distribution channels. Separately and in combination, however, these approaches have had significant disadvantages. Copy-deterrence.

Legal copy-deterrence techniques such as licensing agreements, and litigation against companies and universities whose members knowingly or unknowingly engage in piracy are inefficient, expensive, and often unsuccessful. They incidentally create large numbers of "software criminals" or "pirates" who routinely violate these unenforceable, hard-to-understand, and often unreasonable contracts.

Hardware and software copy-deterrence technologies have also been developed, but they often raise the price and complexity of the software product, and inspire the development, sale and use of counter-technologies intended to defeat these copy-protection technologies. Copy-protection techniques often inconvenience Users who have legitimate needs and good reasons for making copies, and User protests against such inconveniences have in fact caused many software vendors to abandon copy-protection schemes. Yet another disadvantage of hardware-based copy-protection techniques, as well as those which involve modification or customization of the executable program itself is that they prevent software vendors from exploiting the remarkable non-traditional distribution networks which have sprung up in the software marketplace, and which have given rise to the alternative approach, copy-encouragement.

Copy-Encouragement

Shareware programmers and vendors encourage their users to copy, share, and distribute software to others in hopes that an adequate proportion of recipients will voluntarily contact the vendors, register themselves, and pay for the software which they are using. Only a small fraction of users actually oblige, but the non-traditional distribution channels reach so many potential customers so cheaply, that the shareware strategy has been adopted by small-scale vendors who do not have the resources for traditional manufacturing, advertising, packaging, and distribution methods.

In addition to the explicitly-shareware oriented software vendors, it has been observed that many purveyors of popular software packages actually tolerate a large amount of illicit copying in the hopes that users will eventually purchase a copy or an upgrade. In any case, it is obviously and crucially desirable to the vendors of easily-copyable software that users register and pay for software.

Users of freely copyable software are often encouraged to register and pay for software by offering them additional benefits including "enhanced" versions of the software. But this strategy is deficient: withholding such benefits reduces the attractiveness of the product to potential users, and reduces the probability that users will recommend or give the program to other paying customers. And once a user has purchased one enhanced copy, he or she has even less incentive for registering additional copies to be used on additional machines, and is now able to pirate the more powerful program, thus undercutting incentives for registration among future users who might receive copies. There is a need for a means of INSTANTLY rewarding Users who register and pay for freely copyable software, without undercutting future incentives for registering, copying, and distributing additional copies.

Another problem with the prior art is that the people who actually create software (i.e., programmers) often do not have the financial resources, business experience, time or motivation required for registering, billing, and collecting money from paying users. This is why they often license their programs to established publishers and settle for a small percentage of the profits which arise from the sale of their creations. Programmers would benefit greatly if they could "program a business operation" into their software just as they can now "program a computational operation" into their software—i.e., by adding a few lines of code which activate other routines which will do their bidding. The present invention provides a means of satisfying this unrecognized need in the industry.

OBJECTS OF THE PRESENT INVENTION

One object of the present invention is to encourage users to pay for, and register the freely-copyable software they actually use.

Another object is to enable programmers to "program a business operation" by writing a few lines of code, and thus reduce their financial and other dependence upon software publishers, distributors, and vendors.

Another object is to allow programmers to be confident that their licensed representatives (software distributors and vendors) are in fact reporting and paying royalties on all product sales.

Another object is to encourage and allow users to evaluate and exploit useful software before deciding whether to purchase, and to provide a convenient and rapid way for them to purchase access to advanced features severally or individually, as they and the programmer choose.

Another object is to incent users to distribute freely-copyable software to other people who would benefit from, and possibly purchase the software.

Another object is to create economic and pragmatic incentives which deter piracy: the idea is that if higher registration rates could be attained, software prices could more accurately reflect their actual utility to the average user. This would reduce the incentives for piracy and associated technologies.

Another object is to increase the availability and profitability of freely copyable software and of the grassroots distribution channels.

Another object is to enable users to gain instant access to advanced features of freely copyable software with minimal delay through virtually any form of communication technology with or without auxiliary telecommunications equipment such as modem.

Another object is to eliminate the need for costly and inconvenient non-copy-able adjuncts to software programs (such as expensively printed manuals and packaging, hardware locks) etc., whose only purpose is to deter illegal copying of software and whose effect is to inflate software prices.

Another object is to improve upon the technology embedded in the author's prior art (TAU) so that technology can be made available to other programmers as freely-copyable software tools.

Still further objects and advantages of the present invention will become apparent from a consideration of the ensuing description and drawings.

SUMMARY DESCRIPTION OF THE INVENTION

Some of the above objects have been partially realized in a computer program developed for different purposes by the present author in 1989. This is probably the most relevant prior art, and the present invention is both an improvement and a new use of the authors earlier invention, and of other related inventions, such as U.S. Pat. Nos. 4,796,220 and 5,113,118.

My previously-developed program ("TAU" for the scientific analysis of biological rhythms data) is not copy-protected, and copying is encouraged. However certain "advanced features" of the program are inaccessible on a given machine until a unique, or nearly-unique password is installed on that machine. These advanced features (such as the ability to make publication-quality reports) are inessential for educational and evaluation purposes (and so they do not discourage distribution along the grassroots channel), but they are desirable for serious or professional use (and so they do encourage user registration). The instant the password is installed, the "advanced features" of the program are unlocked. The password, like the program itself, is freely-copyable (so backups can be made and restored freely on the machine for which that password is appropriate). However, since the password is useless on other machines to which copies might be transferred, a new password must be purchased for each new machine on which the advanced features are desired. Thus the method encourages all users to evaluate, copy, and distribute the software to other machines and other potential users, while at the same time encouraging serious users to register and pay for not-merely-evaluative use.

During two years of experimental monitoring, some deficiencies of this method were identified. While the method did ensure that the software vendor would report and pay royalties to the author (who was the only party with the routine for generate appropriate passwords) the process by which the user obtained a password proved inconvenient for vendor, author, and customer. The protocol for obtaining passwords was: Program presents ID to User, User gives ID to Vendor (by phone, mail or fax), Vendor gives ID to Author (by phone), Author gives Password to Vendor (by phone), the Vendor gives ID to User, User gives ID to program (via the keyboard), the program installs the ID. The present invention preserves the security advantages while simplifying and making more flexible the process by which passwords are obtained. A second deficiency was that while the method allows selective locking of particular features in an otherwise functional program, it became clear that we needed a method by which Users could selectively purchase only those advanced features which were required on a particular machine. A third deficiency was that when users upgraded or repaired their computers over the course of the experimental period, we had to issue replacement passwords at no charge, and had no convenient means of verifying claims about computer modifications. During testing it became clear that if such deficiencies could be addressed, and if the scheme could be disembedded from the particular biological rhythms program for which it had been developed, it could be of quite general utility. The present invention addresses these deficiencies, generalizes the scheme tested in the authors earlier creation, and disembeds it from that experimental context in such a way that it can be incorporated into other programmer's and software producers creations.

BRIEF DESCRIPTION OF THE DRAWING

The invention will be described with respect to a drawing, of which.

OVERVIEW OF THE INVENTION

The invention as described is most easily understood as a set of software tools which computer programmers can incorporate into their own programs by adding a few lines of code. These programmer-written lines activate the software tools which enable or perform some or all of the functions to be described. However, it should be understood that the scope of the present invention is not restricted to the distribution of executable software such as computer programs per Se. For example, the invention could just as easily apply to a freely-copyable audio tape which would play at full fidelity only on an audio processor which was programmed to require a valid password. Thus, the protected software and the programmer's program might be separate entities with the latter integrated into firmware, the protected software and the programmer's program might be integrated with each other as in the case of my program TAU, and so on.

Figure 1:
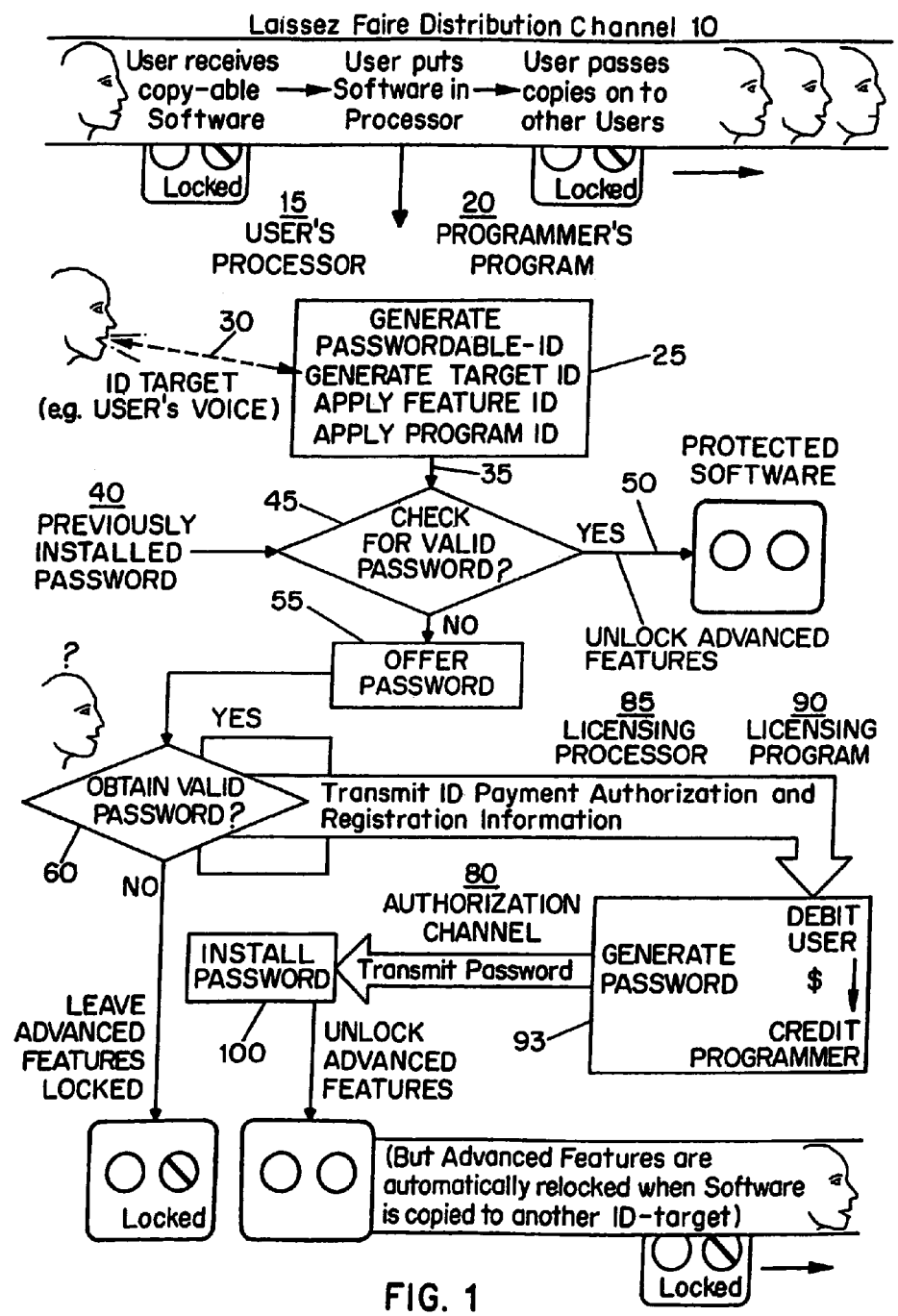
FIG. 1 is an illustration of the physical entities, processes, and functions which comprise the present invention.

FIG. 1 illustrates the physical entities, processes, and functions comprise the present invention.

Figure 2:
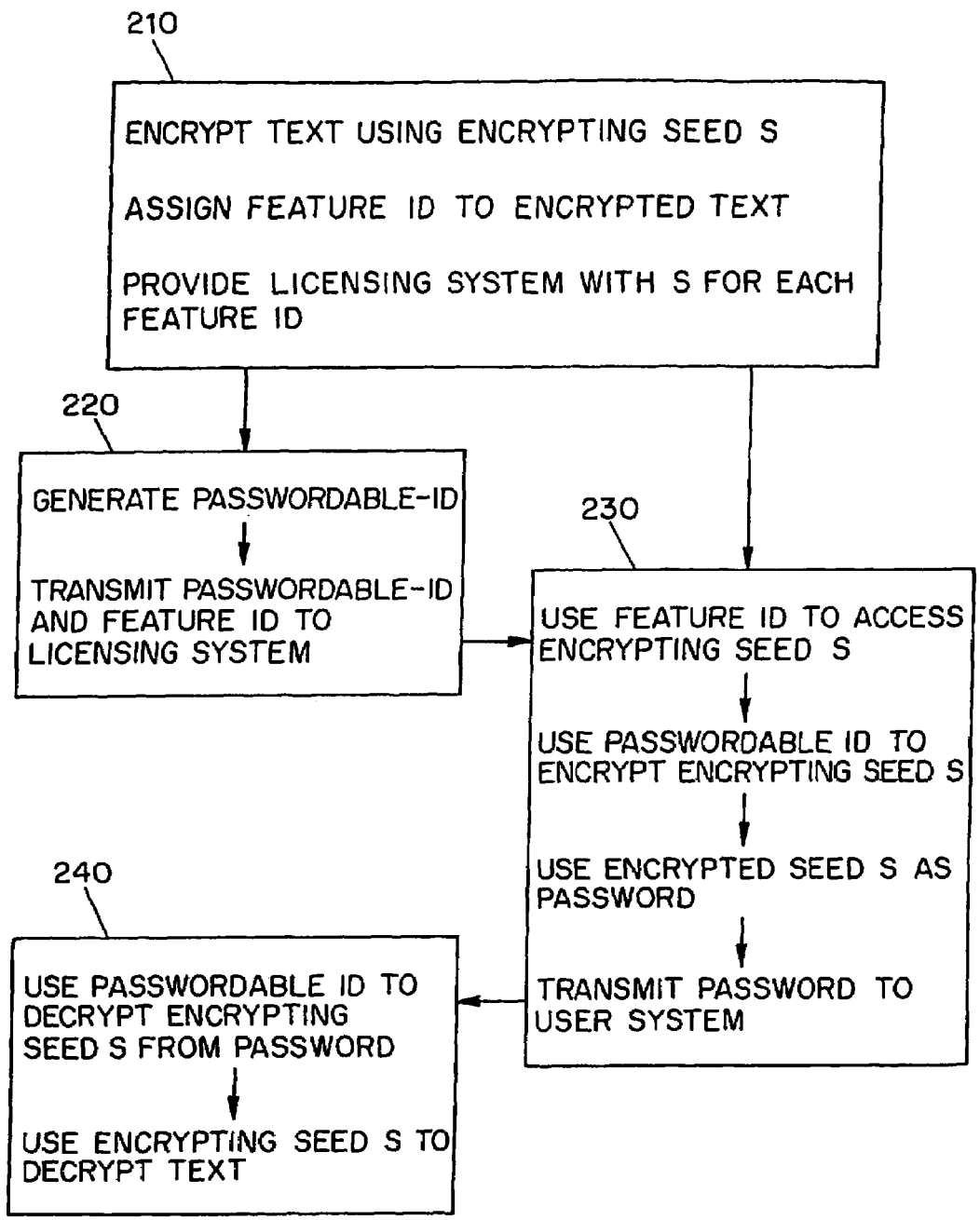
FIG. 2 is an illustration of a technique used in connection with the invention whereby the Encrypting/Decrypting Seed only needs to exist transiently in the User's System.

FIG. 2 illustrates the encryption protocol. The User acquires freely-copyable software through the "Laissez Faire Distribution Channel" 10 which comprises all of the methods previously described as non-traditional distribution channels as well as other distribution methods which might be developed in order to exploit the present invention. The "User's Processor" 15 is the device (typically a computer, or digital signal processing device) which processes "the Protected Software" under the control of the "Programmer's Program" 20, and the Licensing Processor 90 under the control of the Licensing Program 85, generates passwords for one or more Programmer's Programs and may also transact financial other transactions with eh User. The Authorization Channel 80 will often consist of a 2-way telecommunications channel such as a telephone line, and participates in the transmission of IDs, Passwords and other information between the User's Processor and the Licensing Processor.

When a Valid Password is Already Present.

We first describe the processes which occur when a User executes the Protected Software in the presence of a previously-installed valid password. When the Programmer's Program 20 is loaded and executed on the User's Processor, one of its component processes is to "Generate a Passwordable ID" 25 based in part upon the adequately-unique characteristics of an ID-Target. The ID-Target 30 is the entity to which access to the Software's advanced features is linked. In the figure, it is supposed that the ID-Target is the User's voice, but in other embodiments it might be the serial number or other distinct features of the User's processor. (Prior art methods by which ID-targets such as voices might be characterized for the production of Target-IDs will be discussed below.) Once a Passwordable ID is generated, the Programmer's Program looks in an information storage location for a "Previously Installed Password 40. In a computer, the information storage location would typically be a file on a hard disk drive, but in principle the Password could be installed in any location accessible by the Programmer's Program, including the memory of the User interacting with his or her Processor. The Programmer's Program then conducts a Check 45 to determines whether the Previously Installed Password (if any) is the correct match for the specific Password-able ID which has been generated. If the password is valid the Programmer's Program Unlocks the Advanced Features of the Software, and gives the User full and unimpeded access to the program's advanced features (End State 50).

No Valid Password

If Check 45 does not find a Valid Password, the Programmer's Program gives the User the information he or she needs in order to decide whether to a password for the Software's still-locked Advanced Features. Given this Offer 55, it is up to the User to decide whether or not to Obtain a Valid Password (60) and communicate that decision to the Progammer's program. If the User decides not to obtain a valid password, the program simply leaves the advanced features Locked (End State 70).

User Decides to Obtain a Valid Password

However, if the User's Decision 60 is to obtain a valid password, an Authorization channel 80 must be activated which establishes communication between the User (or his processor) and the Licensing system which is comprised of Licensing Processor 85 executing Licensing Software 90. The function of the Authorization Channel 80 is to send the Passwordable ID, and typically other payment information as well, from the Programmer's Program to the Licensing system and then to transmit a valid Password from the Licensing System to the Programmer's Program. The functions of the Licensing system is typically to receive payment information from the User, arrange for the transfer of funds from the User to the Programmer, and generate and transmit the specific password required by the Passwordable ID. Upon receipt of the password the Programmer's program unlocks the advanced features of the program just as in Step 50, and also installs the Password in storage location 40 so that on subsequent executions of the Programmer's program the flow of control will terminate at End State 120, (identical to end state 50) with Advanced Features Unlocked.

Punchline

Note that if a copy of the now-Unlocked software is copied to another ID-target it will automatically relock, provided either that the new target-ID is different from the old target-ID, and/or that the Password for the original ID-target was installed in such a way that it could not be transferred to the new ID-target.

DETAILED EXPLICATION OF THE INVENTION

The Laissez Faire Distribution Channel

The present invention differs from earlier inventions in separating the distribution channel by which software is acquired and distributed from the authorization channel by which licensing is transacted. One advantage of this innovation is that it allows Users and software distributors to support rather than impede the flow of information through the Laissez Faire Distribution channel which develops relatively spontaneously and at little cost to participants when freely-copyable software is present. Another advantage is that relatively little information needs to flow through the proprietary authorization channel. The present invention may well expand the Laissez Faire Distribution channel by making it economically viable for Software publishers to distribute software through the mail, as give-away items tucked into the volumes of third-party books, or as donations to public libraries, and so on. Note however, that while the Laissez Faire Distribution Channel may thus support and be supported by the present invention, it is not a necessary part of the present invention. The present invention could also support the distribution, by mail and other means, of non-copyable software (e.g., on CDROMs), provided only that access to advanced features can be locked in the absence of a valid password on the User's System.

The User's System

The nature of the User's Processor and the Programmer's Program will depend on the nature of the Protected Software being processed. The processor for a protected computer program or a protected text file is typically a traditional computer; the processor for a protected audio-tape is a tape player, and so on. In essence then the User's processor is a device which processes the protected software under control of the Programmer's Program. Several observations are pertinent. First as multi-media processors are developed they will be able to deal with more and more kinds of protected software in an integrated fashion, so the scope of the present invention should be increasingly broad. Second, the Programmer's Program need not necessarily be distributed or distributable through the Liassez Faire Distribution Channel. It could therefore be incorporated into the hardware, firmware, or software of the User's Processor. Thus, to the extent that the User's Processor has been made to mediate the methods of the present invention, it is intended that it be covered by this patent.

Generic Passwordable-ID

The Passwordable ID is the adequately-unique string of symbols for which a specific password is required. The oxymoron "adequately-unique" is used because (1) adequate utility may be achieved even if Passwordable IDs are just variegated enough to significantly reduce the probability that a password obtained for one ID-target will work for another ID-target to which the first password might be transferred, and (2) because the need for one-of-a-kind uniqueness can be further reduced if passwords are installed (in step 100) in such a way that they are not transferrable from one ID-target to another.

The ID must be generated in such a way that two ID-Targets will generate different IDs. Also, in order that a plurality of Licensed-features in a plurality of software programs be independently licensable on the same ID-Target, any two Licensed features must be able to generate different IDs even in conjunction with a single ID-Target. Those familiar with the art will recognize that this can be achieved a variety of ways, in one preferred embodiment, each item of protected software is assigned an adequately unique P-digit Program ID, and each licensed Feature is assigned an F-digit Feature-ID, and each ID-Target can be associated with a T-digit Target-ID such as a serial number. Once assigned (using methods described below) these ID numbers are combined in a fashion which preserves their uniqueness (e.g., by concatenating them to produce a number with N+M+T digits capable encoding $10^{(N+M+T)}$ values) and then using this combination, an encryption of it, or some other adequately-unique transform of it, as the ID.

In addition, to ensure error-checking when the Passwordable ID is transmitted to the central computer (80), it is desirable that a Passwordable ID satisfy some kind of coherence constraint such that the mis-report of a single digit can be detected. One coherence constraint would be to append two more digits to the ID which would constitute a checksum for the preceding digits. Thus an error would be detected when the checksum and the preceding digits were inconsistent.

Other information could usefully be encrypted into the ID as well. For example, to facilitate compensation of the software creator and to ensure that the correct price is being assessed for a given Password (Step 95), the ID could also encrypt the price of the software and the name of the party who should receive royalties, and so on.

Thus the invention requires only that an adequately unique ID be generated; it does not require that the ID be generated any particular way, and our invention should not be considered to be dependent on any particular method. As illustrated in the next paragraphs, a variety of methods can be adopted by individual programmers to suit the needs of their application.

Method of Assigning Feature-IDs and Program IDs

To the extent that a sufficiently large number of digits have been allocated Feature and Program IDs, the programmer can safely use a randomly-seeded number generator to select values for these IDs, since the probability that two programmers would fall upon the same numbers is adequately small. Alternatively, unpredictable Feature-IDs can be assigned by a central computer maintained by operator the Licensing System, which computer maintains a data-base of previously assigned IDs.

Method of Assigning Target-IDs

The method of assigning target-IDs, will depend upon the nature of the ID-Target device, the requirements of the Programmer's program, and the intended distribution. It should be noted that target-IDs need not be genuinely unique for the present invention to be of substantial utility: it is sufficient that they be rare enough to substantially reduce the probability that the ID assigned to one ID-Target will not also be assigned to one of the ID-Targets to which the software might be copied. Furthermore, to the extent that adequately rare Target-IDs cannot be assigned, the objectives of the invention can still be achieved by rendering the installed password non-copyable using conventional copy-protection techniques. Thus, the purpose of the next paragraph is to demonstrate that adequately unique IDs can be generated in a variety of existing and anticipatable situations using currently-available technology.

Those with ordinary skill in the art will recognize that many ID-Target devices possess unique identifiers which can be accessed by the Programmer's Program and used as the basis for target-IDs. For example, many computers, printers, hard-disks, and CD-Rom disks have software-accessible serial numbers. Of those devices which do not have serial numbers, many have software-assessable characteristics (such as the number and kind of peripherals, central processing unit chips, the interleave factor and timing characteristics of the hard drive, etc.) which can be used to generate a target-ID which is sufficiently unique to satisfy the needs of the situation. In addition, a variety of computer devices have been invented for retrofitting a computer with a unique serial number, and these too could be used to generate target-IDs on computers which were so-equipped.

Other kinds of ID-targets, such as the voice of the User can be characterized using existing pattern-recognition technologies to generate a user-specific target-ID which is "fuzzy enough" to recognize the user under varying conditions, but specific enough to reject other Users.

In this paragraph we disclose a software-based method we have developed to retrofit Target-IDs with writeable non-volatile storage devices (such as computer hard drives or programmable read-only-memory (PROM) chips. By this method, a nearly-unique "tattoo" is generated and written to the storage device. The near-uniqueness of the "tattoo" can be achieved by using a random number generator initialized or "seeded" in a fashion which will vary from one ID-Target to the next (this facility is typically incorporated into a "randomize" command in many programming languages). Alternatively or equivalently, a nearly-unique ID can be based upon a high-resolution time-stamp generated using the processor's system clock, or by a variety of other means. To the extent that this "tattoo" is the only source of the Target-ID's uniqueness it is desirable that it not be copyable from one ID-target to another. This can be achieved by hiding the tattoo from the User, copy-protecting it, etc., using techniques known to those with ordinary skill in the prior art.

Once the Feature-, Program- and Target-IDs are assigned, the Passwordable ID which synthesizes them can be generated using methods like those described above. Check for Valid Password (step 45), Generate Valid Password. (step 93)

Because the method of determining the validity of the password (step 45) depends upon the method by which passwords are generated (step 93) in the Licensing Processor (90), these two processes will be described together.

The User's Processor under control of the Progammer's Program checks for a valid password by accessing the password storage location of step 100, and determining the validity of any candidate passwords found in that location. One password generating method uses the ID, or some transform of it, as the seed to a deterministic number generator and uses the random number generator to generate a deterministic but unpredictable Password. In that case, the method by which the Programmer's Program determines the validity of the password is: use the same method to generate the Password in the User's processor, compare the password generated to the candidate password, deem the candidate password valid if it is identical to the generated password.

An acceptable but undesirable feature of the method just-described is that the password-generating algorithm must be secreted inside the Programmer's program where it might be discovered by hackers seeking to breach the system. This shortcoming could be eliminated if the Programmer's Program were capable of validating, but not generating, a valid password. One way this could be accomplished is to ensure that the licensing system is substantially more powerful than the User's system. In this case, one could exploit the fact that prime factorizations of large numbers are easier to confirm than to generate by adopting the convention that the password generated by the licensing system would be the prime factorization of an N-digit number produced using the ID as randomization key, where N is chosen to be within the factorization capabilities of the licensing computer but not the Users or hacker's computer. Under this password-generation method, the password-validation method (which would be within the capability of the User's computer) is to generate the N-digit number and confirm that it is indeed the product of the factorization contained in the password.

Another way which could ensure that the programmer's program could validate but not generate a Password is to exploit the fact that, given a sequence of pseudo random numbers, and given a candidate-seed, it is easy to confirm that the sequence is generatable from the candidate-seed, but it is difficult to generate the seed from the pseudo random number sequence alone, unless one also has a detailed understanding of the random-number generation algorithm and an algorithm for reversing its operation. This fact could be exploited for the present invention by putting the random-number generating algorithm in the Licensing program, while secreting the reverse-operation algorithm in the Licensing Program only. Then the Password for a given Passwordable-ID could be the random number seed capable of generating that Passwordable-ID. Thus, the Licensing System would have the wherewithal to generate that Seed while the User System would only have the ability to confirm it. To prevent hackers who had isolated the random number algorithm in the Programmer's Program from using an iterative trial and error process to discover the Seed capable of generating the Password-able ID, one could ensure that the random-number generation algorithm requires so much computational power that, while it would be fast enough to generate a particular sequence when provided with a seed, it would be too awkward to be used to test all possible seeds to find one which generates the particular sequence. [There are citable patents and texts which explain random number-generation methods]

Other methods to increase the security of the password validation method can be envisioned, and are intended to fall within the scope of the present invention.

Unlock Advanced Features

The result of the Password Validation method 45 must be made available to the Programmer's Program. This can be achieved by providing the programmer with a function such as PasswordIsGood(ID,Password) which returns a value of true if the Password is valid, and false if not. Conventional programming techniques can then be used to unlock an Advanced Feature if the function returns true. For example, If PasswordIsGood(ID,Password)
then Enable_Advanced_Feature.

Offer Password

If PasswordIsGood returns false, this can similarly be used to trigger routines which provide the User with instructions about how to obtain a valid password, and invite the user to do so. The nature of these instructions depends upon the Authorization Channel used in step 80, but minimally they must provide the User with the information required to make an informed decision about whether or not to acquire a password. This might include information about the benefits of the Advanced Feature and the costs of obtaining a password for that advanced feature.

User Decision: Obtain Valid Password?

It is thus the user's decision (step 60) whether to acquire a Password or not. If the User decides not to acquire a password, the Advanced Feature in question remains locked.

Enable the User to Obtain a Password if Desired.

If the User elects to purchase a password to unlock an advanced feature he or she can be given appropriate instructions, based upon the Authorization procedure 65 and Authorization Channel 80 adopted by the programmer.

Minimally, the ID must be transmitted to the central computer. In addition, the software vendor may want to receive payment, and personal registration information such as name, address telephone number, computer system, etc. All of this can be accomplished easily using readily available technology, with or without human assistance.

For example, the Licensing software could inform the User of the Feature ID for which a password is needed, and instruct the User to call a particular telephone number and submit the ID) via voice, touch-tone keypad, etc. Payment for the password can be transacted by using a 900 (toll call) telephone number, or by instructing the user to submit a credit card number, etc. Credit cards can be confirmed while the User is on the line, and during this time registration information can also be obtained over the phone, if desired. When the ID is received by the Licensing Computer computer, it is checked for internal consistency based upon the methods of Step 25 to assure that there have been no communication errors during transmission of information from Licensing-processor to central computer. When consistency has been confirmed, and payment (if any) transacted, voice-technology is used to give the User the password to invite the User to repeat the password (for purposes of checking), and to correct the User if there has been any miscommunication of the password. Then Instruct the User to submit the password to the Licensing Software and to hang up the phone. And finally, arrange for the Programmer to receive appropriate compensation, e.g., by transferring the payment received from the User, minus a commission, to an account dedicated to the programmer.

Alternatively, if the User's Processor can be put in direct communication with the Licensing Processor, (e.g., if the Licensing Processor is equipped with a modem), all of the User's decision, registration and payment information can be obtained off-line by the Programmer's Program and then the two Processors could computer could communicate rapidly and automatically with out any User involvement. In this case, the User need not be informed about the nature of the ID or Password.

Alternatively, albeit much more slowly, communication with the central computer could be conducted via paper mail with human intervention. And so on. It will thus be understood that these are examples of preferred embodiments, and that other variations improvements, etc. are intended to fall within the scope of the present invention.

Transact Authorization

All of the transaction-authorization functions of the Licensing, Processor, under control of the Licensing Program, can be implemented using commercially available voice-processing and computer technology. Some or all of these functions could also be accomplished with human intervention, e.g. by a telephone operator associated with the Licensing Processor. Thus, it is the procedures described here which are the essential features of the present invention, not the specific implementation.

Minimally the Licensing Processor (with or without human assistance) must receive the transmitted ID, generate the appropriate password using methods complementary to those of the Validation Procedure 45 as discussed previously, and transmit that password back over the authorization channel.

Additionally, the Licensing Processor may be programmed to charge the User for the Password in a manner consistent with the Password Offer of Step 55, and credit the Programmer appropriately. If the Authorization Channel 80 is a 900 telephone number, debiting of the User is automatic; crediting the Programmer would be accomplished by updating a database of payments due, triggering a transfer of funds by communicating with a banking computer, etc. Alternatively, the Licensing Processor can be programmed to obtain and confirm the validity of a credit card or purchase order number before providing the password, and so on.

Finally, the Licensing Processor may be programmed to obtain registration information such as the User's name, address, telephone number, make and model of processor, etc. This information may be of such value to the purveyor of the protected software (e.g., for purposes of advertising or follow-up sales) that it may be economically viable to accept registration information in lieu of monetary payment. This information would then be stored in a conventional database to which the Software purveyor would have access.

Install the Valid Password.

Once received from the Licensing processor, the valid password must be installed in a non-volatile storage area such as a file on a hard disk so that on subsequent occasions when the licensing software is run on the licensing processor, the correct password will be found and the relevant advanced feature will be unlocked (step 50).

To the extent that the Target IDs assigned in step 25 are not one-of-a-kind on each ID-Target, it is desirable that the installed passwords be laid down in a fashion which renders them tamperproof and non-copyable, using copy-protection technology of the prior art. That way, a new password will be required on a new ID-target, even if the User uses a mass-copy operation to transfer all (copyable) files associated with the program to the new ID-Target, and even if the Passwordable ID in the context of the new Target-ID is identical to that of the old ID-Target.

Unlock Advanced Features

Additionally, upon receipt of the valid password it will be convenient to unlock the Advanced Features of the program as in Step 50.

Exemplary Embodiments

In order to partially indicate the scope of the present invention, two embodiments and applications consistent with the foregoing will now be described.

The author's previous computer program, TAU, could be improved by adopting the present invention. The computer program would be freely-copyable and incorporate both the Protected Software and the Programmer's Program. The Target-IDs would be distinguishing features of the User's Processor (e.g. a serial number in the CPU) and two Advanced Features would be the ability to produce high quality printouts and the ability to save modified data to disk. According to the methods of step 25, the two Advanced Features would generate two Passwordable IDs which are adequately-specific to the User's Processor. The Programmer might find it convenient to adopt the convention of storing passwords for these IDs on the Hard Drive of the User's Processor in files whose names are identical to the IDs. If valid Passwords are determined to be absent during Check 45, then whenever the User attempts to use the Locked Features, she would be invited to telephone the site of the Licensing Computer, and to give a human operator there the specific IDs required as well as a credit card number. If the User's Decision 60 is to obtain a password for high quality printouts, she telephones the human operator, provides the Passwordable-ID for that advanced feature as well as credit card authorization information and receives in return the Password for that ID. A utility incorporated into the computer program would allow the User to type in any passwords obtained, then install passwords, and unlock the appropriate advanced feature.

In another application and embodiment, it may be supposed that the Protected Software is encrypted in a freely-copyable text file containing information which is intended to be displayed on a computer screen only in the presence of a particular authorized individual who is identified on the basis of his vocal characteristics. In this case, the ID-Target would be the User's voice, the Protected Software would be the text file, and the User's Processor would include appropriate voice recognition hardware and software (the latter software including the Programmer's Program). So that a tape-recording of the User's voice could not be used to thwart the present scheme, the feature ID would be computed as follows: Each time it is desired to assess the characteristics of the User's voice, present a short random sequence of letters and ask the User to read them aloud. Using prior-art voice recognition technology (e.g., that which is already being marketed by vendors such as Dialogic Inc.) to confirm the sequence of letters spoken and generate a Target-ID which numerically encodes parameters which distinguish human voices. The password for this Target ID would be a sequence of letters to be memorized by the User. If the sequence is the correct one, the appropriate Advanced Features of the encrypted text are decrypted by the Programmer's Program; if the User does not present an appropriate Password, he is invited to obtain one as in the previous example. Thus in this example, the User's own memory would be the storage location for the Password.

Description of One Possible Software-Tool Implementation.

One object of the present invention is to allow programmers to conveniently invoke the first-described methods by adding a relatively small number of lines of code to their own programs. This can be achieved by supplying programmers with a few simple commands which invoke more complex operations implemented in pre-compiled object modules or units. An exemplary implementation in the Pascal language is now described with the understanding that other languages and applications will require different implementations, and that programmers may well want to augment or replace one or more of these routines with variants of their own, while remaining within the scope of the invention.

function GetTargetID:longint; (step 30)

This is a function required for step 25, returning a number which is adequately-specific to the ID-Target 30. Variant functions might be provided which are more or less specific in order to suit the needs of the programmer, and in order to adjust the sensitivity the Target-ID to small changes in the characteristics of the ID-Target (for example, if the Target-ID is a User's voice, it might be desirable for the ID-Target to remain constant when the User's voice is hoarse or stressed).

function MakeID(GetTargetID, FeatureID, ProgrammerID): longint;

This function implements step 25. It generates the Passwordable ID based upon the Target-ID (obtained from GetTargetID or by other means of the programmer's devising), upon a FeatureID (assigned by the programmer), and upon (in one preferred implementation) a ProgrammerID which encrypts the identity of the Programmer who should receive royalties for purchased passwords.

function GetInstalledPassword:longint;

This function looks in a predetermined storage location 40 (e.g., in a file with a particular name, or a name based upon the ID itself) for a candidate password. If no Password is found, GetInstalledPassword gets a default value such as 0. If a password is found, GetInstalledPassword returns the value of that Password.

function PasswordIsGood (GetID, GetInstalledPassword-): boolean;

This Function implements step 45. If the InstalledPassword is valid for the ID in question, GetPasswordValidity returns True; otherwise it returns false. The Programmer's Program can use this value to decide whether the advanced feature(s) should be unlocked or whether to User should be invited to obtain a valid password.

function GetNewPassword:longint;

This routine demonstrates a way in which a programmer could invoke steps 55, 60, 93, 95 through the use of a single function. One possible implementation of the routine, in pseudo-code, follows.

```
Function GetNewPassword(GetID):Longint;
begin
writeln('Because the current password, is not valid
    you will not be able save your document to disk.
    A call to the licensing-computer's 900 number will
    cost you only $1.00, and take only 30 seconds,
    and your password will remain valid as long as you
    keep this computer.
    Shall I use the modem on your computer to get you
```

-continued

```
    a password to unlock this advanced feature? ')
if UserSaysYes then
    Get_Modem_To_Get_Password_For_This( ID )
       else
    GetNewPassword :=0;
end;
``` procedure InstallNewPassword(NewPassword):

This procedure implements step 100. By installing the password in the storage location which is searched by function GetInstalledPassword. To the extent that the Target-ID obtained in step 25 was not adequately-unique, it may be desirable to use existing technology to install the password in hidden and copy-proof fashion. That way, even if multiple machines require the same password, the password will have to be obtained on each such machine.

Example of Programmer's Program.

Given the above, the Programmer can "program in" the computational and commercial operations embodied in the present invention by using a boolean array called AdvancedFeatureIsLocked to determine whether the AdvancedFeature is to be executed or not each time the User tries to invoke that AdvancedFeature.

An example would be
   if AdvancedFeatureisLocked [FeatureID] then OfferPassword else ExecuteAdvancedFeature (FeatureID);

Given the above, the Programmer need only execute the following lines at the beginning of the program or any time it is desired to give the User an opportunity to purchase a password.

```
If PasswordIsGood( MakeID( GetTargetId, FeatureID,
                      ProgramID) , GetInstalledPassword)
    then AdvancedFeatureUnLocked[FeatureID] :=False;
    else begin
        NewPassword:= GetNewPassword;
        if NewPassword<>0 then begin
            InstallNewPassword( NewPassword );
            AdvancedFeatureIsLocked[FeatureId] :=False;
        end;
    end; {Password was not Good when first checked}
```

Extensions and Enhancements

The invention could be enhanced in a variety of ways which would make it even more convenient for User and Programmer. The following disclosures are offered as exemplary embodiments and extensions of the foregoing teachings, and should not be construed to limit the scope of the present inventions.

Increasing Utility

Those with knowledge of the prior art and the teachings of this patent will recognize that "package" Passwords could be offered which would unlock "suites" of advanced features at reduced cost or inconvenience to the User. When the protected software is part of the Programmer's Program this could be easily implemented by the Programmer using new boolean variables (such as "Suite3IsUnlocked"); when the protected software is non-executable text, this could be easily implemented by encrypting a suite of narrow-scope passwords in a block of text which can only be decrypted using a higher-scope Suite-Password; and so on.

Increasing Security

The invention as described provides a substantial deterrent to the casual piracy of protected software, but its utility does not require that it be immune to the concerted efforts of skilled hackers. Numerous "hacker-proofing" improvements can be imagined such as basing the uniqueness of the created "tattoo" upon the User's reaction time in response to some prompt rather than upon the system clock on the assumption that the former might be more controllable through technological means.

Protecting Non-Executable Data

As noted above, the Programmer's Program and the Protected Software need not be identical, and neither need to be freely-copyable in order to fall within the scope of the present invention. Nor must the Protected Software be executable code. In one embodiment, for example, both the Programmer's Program and the Protected Software could be distributed on non-copyable CDROMs, and the Programmer's Program could serve decrypt data stored in separate files on the CD-ROM. In this situation, and in other situations in which the Advanced Features in question are encrypted data, the function of the Programmer's Program is to provide access to the encrypted data if and only if a password is present which is specific to the adequately-unique ID of the User's ID-Target (e.g., the CD-ROM disk, or the CD-ROM player). One way that this could be accomplished would be for the Programmer's program to contain the key needed to decrypt the encrypted data and to invoke that key only in the presence of an appropriate password. However, in order to make it more difficult for crackers to decrypt the encrypted data in the absence of a valid password, it would be preferable if the Programmer's Program simply lacked the information the cracker requires. Several ways in which this could be achieved is disclosed in the next paragraphs, which can be considered an expanded explanation of the processes required to Generate Passwords and Unlock Advanced Features.

Encrypt each Advanced Feature (e,g., a block of text) using a prior-art keystream encryption technique based upon a pseudo-random keystream generated by a pseudo-random number generator initialized with an arbitrary Encrypting seed. In this technique, successive pseudo-random numbers are used to transform in a reversible fashion the successive characters of a text-to-be-crypted (e.g., by applying the XOR operation). Decryption involves the regeneration and application of the same pseudo-random number to the encrypted data, and therefore requires that the Encrypting Seed be located in the Programmer's Program or in the Encrypted text, where it might be discoverable by hackers.

However, using the following technique, the Encrypting/Decrypting Seed only needs to exist transiently in the User's System. As illustrated in FIG. 2, the preliminary step 210 is to Encrypt each block of text to be treated as a single Advanced Feature with a different Encrypting Seed S, and assign a Feature ID to that text. A table associating each Encrypting Seed with its corresponding Feature ID is provided to the Licensing System, but is not provided to the User's System. When the User decides to obtain a Password, the Licensing computer is provided with the Passwordable-ID and the Feature ID as in step 220. With this information the Licensing System can execute step 230, using the Feature ID to access the Encryption Seed S for the Feature in question, and encrypting S using the Passwordable ID as an encrypting seed for a new pseudo-random keystream. The now-encrypted S is then treated as a Password to be transmitted to, and installed on the User's system. Once it possesses this password, the User's system can execute step 240: using its own Passwordable ID, it decrypts S, uses S to decrypt the text, and then discards S. In this way, the decrypted S is only transiently present in the User's system, and is only accessible in the User's system with the appropriate ID.

A variation of the above scheme is more secure, but is only applicable when relatively large amounts of data can be transmitted to the User's system (e.g., through a digital data link connecting the Licensing System to the User's system. In this variation, the text to which the User seeks access is itself treated as the Password to be transmitted and stored on the User's System. Prior to transmittal, the Licensing system encrypts the text using the User System's Passwordable ID as the encryption seed. The User's system will be able to use its own ID to translate the "password" into the desired text, but other systems with different IDs will not.

In the previous sections, it was assumed that the reader would view the protectable non-executable data (called "text" for convenience only) using the Programmer's Program. However, it would be desirable if such data were accessible, in the presence of a valid password, to third-party programs which had not been designed with the present invention in mind. This can be achieved by combining the present invention with prior art of the sort used in commercial software for "on-the-fly" file compression, such as SuperStor, and Stacker. As currently implemented, these "terminate and stay-resident" programs interpose themselves between a computer's Disk-Operating System (DOS) and third-party application programs which obtain data from the DOS. The current function of these programs is to increase the storage capacity of rewritable storage media by transparently compressing the application program's disk output before passing the data on to the DOS, and to decompress data obtained from the DOS before passing it on to the application program. By incorporating the present teachings into this prior art technology, new software could be developed which, in the presence of the appropriate passwords, would decrypt data which had previously been encrypted on the storage medium, and then pass the normal-seeming decrypted data to third party application programs.

Network Environments

Another desirable feature of the present invention is its applicability to network environments. That is, in situations where multiple workstations access files which are stored in a shared file directory, it might be advantageous if a single copy of the Protected Software as well as all Passwords could be located in a central location while passwording was specific to each workstation. This could be accomplished simply by using the workstation as the ID-target, and by storing passwords in workstation-specific locations, e.g., in files whose names are based upon the Passwordable ID. For other programs, it might be desirable if all workstations in a given network were covered by the same server-specific license. This could be achieved simply by using the network server as the IO-target. Other variations of this sort can easily be envisioned and adapted to the needs of the programmer.

Hardware Changes.

A potential problem with the present scheme could arise when users change the characteristics of their ID target. This might have to be dealt with on a case by case basis, but in standard cases, for which standard GetID functions might be provided, there is a solution which is here disclosed. That is, invite users to call a customer service operator for free replacement passwords if minor changes in their ID-Targets have led to changes in Target-IDs, and provide the free password provided that the User's description of the change can be confirmed using the technique of the next paragraph.

In a non-volatile storage location of the User's Processor such as the User's hard drive, store a "profile" which records an encrypted list of the N characteristics of the ID-target on which the Target-ID is based. Create or update this file whenever a valid password is encountered. Whenever an invalid password is encountered compare the values stored within the profile to the values of the Target-ID which has just been computed. In the latter case, construct an N bit word, giving each bit a value (1 or 0) which indicates whether or not the Nth characteristic of the profile differs from the Nth characteristic responsible for the Target ID. This N bit word, transformed or encrypted as desired, can then be communicated to the Licensing System's Customer Service operator who determine which characteristics changed since the last time a valid password was installed on the User's Processor. This determination can then be used check the User's veracity, in order to decide whether to honor the User's request for a replacement password.

Password Disks

Some Programmers or Software vendors may not wish to be bound to the software, hardware, or customer support policies of the Licensing System or its managers. It would therefore be desirable to be able to provide Software vendors a means of generating passwords to their own products, but not the products of other vendors. From the point of view of the purveyor of services based upon the present invention, it is also desirable that the number of passwords a vendor could generate be limited in a way which allows the purveyor to receive compensation in proportion to the number of Passwords the vendors generates. This can be achieved by providing Software vendors with modified versions of the licensing programs on tamper-proof and copy-protected media. The modifications would involve constraining the Licensing Program so that it only generates Passwords for IDs based upon a particular Software ID assigned in advance to the vendor purchaser of the Password Disk. (This is easily accomplished using the present teachings when the Passwordable ID encrypts the Software ID; then the Licensing Program can be made to refuse Passwordable-IDs which are based upon other Software IDs.) Prior art tamper-proofing and copy-protection technology available from such vendors as Aztech Inc. of Arizona, can then be used to set the number of times the Licensing Program on the Password Disk can be executed. In this way Password Disks can be sold to vendors at prices are commensurate with the numbers of Passwords to be generated, and purchasers of such Password Disks can then implement their own licensing systems and customer support policies Additional Ramifications Although the description above contains many specificities, these should not be construed as limiting the scope of the invention but as merely providing illustrations of some of the presently preferred embodiments of the invention. For example, other embodiments might involve different ID-Targets such as telephonie numbers, node addresses in local area or wide area networks, visual appearances, biological characteristics of tissue samples, etc. In alternative embodiments, Password-generating processors and/or Password-sensitive processors could include mechanical calculators, optical computers, etc., and Licensed software could include video or multimedia information, non-digital but easily, copyable information such as analog audio or video recordings, etc. Finally, the scope of the present invention is intended to include all distribution channels to which it can be made applicable; for example, under the present scheme computer manufacturers could load large amounts of commercial software onto their products' hard disks and sell to users on an after-the-fact basis.

Thus the scope of the invention should be determined by the appended claims and their legal equivalents, rather than by the examples given.

What is claimed:

1. A method for creating protected information accessed by a user, the method comprising:
generating a first feature of protected information accessed by the user, the first feature being accessible to the user after the user communicates with a licensing system and acquires a first password from the licensing system, wherein the first password is based at least in part on a first characteristic of an entity to which access to the first feature is linked, different characteristics of such entity being usable for such first characteristic; and
generating a second feature of the protected information accessed by the user, the second feature being accessible to the user after the user communicates with the licensing system and acquires a second password from the licensing system, wherein the second password is based at least in part on a second characteristic of an entity to which access to the second feature is linked, different characteristics of such entity being usable for such second characteristic,
wherein the first and second passwords are distinct.

2. The method of claim 1, comprising generating a third feature of the protected information accessible by the user without the first or second password.

3. The method of claim 1, wherein:
the first feature is associated with a feature identifier; and
the first password is additionally based on the feature identifier.

4. The method of claim 1, wherein:
the first feature includes a first set of features packaged together; and
the second feature includes a second set of features packaged together.

5. The method of claim 1, wherein the second password enables the user to access both the first and second set of features.

6. The method of claim 1, wherein at least one of the first and second features includes non-executable text.

7. The method of claim 1, wherein the features are data used by a program.

8. The method of claim 1, comprising generating code effective to enable the user to request the first password.

9. The method of claim 1, wherein said first characteristic and said second characteristic are different.

10. A method for enabling a user to access protected information, the method comprising:
receiving a request for access to a first feature of protected information from a user, the protected information including the first feature accessible only with a first password, and the protected information further including a second feature accessible only with a second password, the first password being based at least in part on a first characteristic of an entity to which access to the first feature is linked, different characteristics of such entity being usable for such first characteristic, the second password being based at least in part on a second characteristic of an entity to which access to the second feature is linked, different characteristics of such entity being usable for such second characteristic, the first and second passwords being distinct; and enabling the user access the first feature without being able to access the second feature.

11. The method of claim 10, comprising sending the first password to the user.

12. The method of claim 10, wherein the protected information is accessed using a digital device and the receiving includes requesting the first password from a device distinct from the digital device.

13. The method of claim 10, wherein the protected information is accessed using a digital device and the first password is stored in the digital device.

14. The method of claim 10, comprising enabling the user to access a third feature of the protected information without the first or second password.

15. The method of claim 10, wherein the request is sent by the user over a network and received by a licensing server.

16. The method of claim 10, wherein the features are data used by a program.

17. The method of claim 10, comprising:
receiving a request for access to the second feature of the protected information;
sending the second password to the user; and
enabling the user to access the second feature.

18. The method of claim 11, wherein:
the first feature is accessed using a digital device;
the request for access to the first feature occurs while the user is accessing a first program; and wherein the sending the first password comprises awakening a second program from a dormant state, the second program including the steps of:
checking the digital device for the first password; and
when the digital device does not include the first password, requesting the first password from a licensing system.

19. A computer readable storage medium on which is stored the steps of:
storing first code to perform a function;
storing protected information in association with the first code, the protected information accessible only with a password, the password being based at least in part on a characteristic of an entity to which access to one or more items of protected information is linked, different characteristics of such entity being usable to provide access to different ones of the one or more items of protected information; and
storing second code in association with the protected information, the second code to enable a user to request the password to access the protected information.

20. The computer readable storage medium of claim 19, wherein the recording medium is optical.

21. The computer readable storage medium of claim 19, wherein the first code, the protected information, and the second code are all stored electronically.

22. The computer readable storage medium of claim 19, wherein the protected information includes non-executable text.

23. The computer readable storage medium of claim 19, wherein the protected information is data used by the program.

24. A computer readable storage medium having stored thereon:
first code to perform a function;
protected information in association with the first code, the protected information accessible only with a password, the password being based at least in part on a characteristic of an entity to which access to one or more items of protected information are linked, different characteristics of such entity being usable to provide access to different ones of the one or more items of protected information; and
second code in association with the protected information, the second code to enable a user to request the password to access the protected information.

25. The computer readable storage medium of claim 24, wherein the recording medium is optical.

26. The computer readable storage medium of claim 24, wherein the first code, the protected information, and the second code are all stored electronically.

27. The computer readable storage medium of claim 24, wherein the protected information includes non-executable text.

28. The computer readable storage medium of claim 24, wherein the protected information is data used by the program.

* * * * *